(12) United States Patent
Amari et al.

(10) Patent No.: US 7,115,308 B2
(45) Date of Patent: Oct. 3, 2006

(54) GLASS PANEL AND METHOD OF MANUFACTURING THE GLASS PANEL

(75) Inventors: Takeshi Amari, Osaka (JP); Hideo Yoshizawa, Osaka (JP); Hiroaki Kato, Osaka (JP); Richard Edward Collins, New South Wales (AU); Nelson Ng, New South Wales (AU)

(73) Assignees: Nippon Sheet Glass Co., Ltd., Osaka (JP); The University of Sydney, Sydney (AU)

( * ) Notice: Subject to any disclaimer, the term of this patent is extended or adjusted under 35 U.S.C. 154(b) by 81 days.

(21) Appl. No.: 10/493,514

(22) PCT Filed: Oct. 3, 2002

(86) PCT No.: PCT/JP02/10344

§ 371 (c)(1),
(2), (4) Date: Apr. 20, 2004

(87) PCT Pub. No.: WO03/035566

PCT Pub. Date: May 1, 2003

(65) Prior Publication Data

US 2004/0253395 A1    Dec. 16, 2004

(30) Foreign Application Priority Data

Oct. 25, 2001  (JP)  ............................. 2001-327756

(51) Int. Cl.
*E06B 3/24* (2006.01)
*C03C 27/00* (2006.01)

(52) U.S. Cl. ................. 428/34; 156/104; 156/109; 52/172; 52/786.1

(58) Field of Classification Search ................. 428/34, 428/63; 52/172, 786.1; 156/107, 109, 104
See application file for complete search history.

(56) References Cited

U.S. PATENT DOCUMENTS 4,592,179 A * 6/1986 Boutarin ....................... 52/172

FOREIGN PATENT DOCUMENTS

| CA | 2363272 A1 | 7/2001 |
| JP | 2001-64042 A | 3/2001 |
| JP | 2001-180985 | * 7/2001 |

(Continued)

*Primary Examiner*—Donald J. Loney
(74) *Attorney, Agent, or Firm*—Fulbright & Jaworski LLP

(57) ABSTRACT

A glass panel comprising a pair of glass sheets (1, 2) disposed with respective faces thereof confronting each other in face-to-face relationship with a gap (V) therebetween and with peripheral edges of the glass sheets (1, 2) being bonded with a bonding sealant (4) to be sealed thereby; an evacuating port (5) for evacuating gas present within said gap (V) to the outside; and a getter (7) for coming into contact with the gas within said gap (V), wherein said evacuating port (5) includes a getter-retaining space (6) for retaining said getter (7) therein, said port (5) being formed in one (1) of said pair of glass sheets (1, 2), said getter (7) being retained within said getter-retaining space (6), said evacuating port (5) being closed and sealed by means of a lid (8). After the peripheral edges of the glass sheets (1, 2) are bonded and sealed by a bonding sealant (4), the gas present within said gap (V) is drawn and evacuated through said evacuating port (5) with said getter (7) being retained within said getter-retaining space (6), then, said evacuating port (5) is closed and sealed by bonding a lid (8) to said one glass sheet (1).

10 Claims, 5 Drawing Sheets

FOREIGN PATENT DOCUMENTS

| | | |
|---|---|---|
| WO | WO-91/02878 A | 3/1991 |
| WO | WO-91/02878 A1 | 3/1991 |
| WO | WO-93/15296 A | 8/1993 |
| WO | WO-01/12942 A | 2/2001 |
| WO | WO-01/47827 A | 7/2001 |
| WO | WO-01/75260 A | 10/2001 |

* cited by examiner (a)

(b)

GLASS PANEL AND METHOD OF MANUFACTURING THE GLASS PANEL

TECHNICAL FIELD

The present invention relates to a glass panel comprising: a pair of glass sheets disposed with respective faces thereof confronting each other in face-to-face relationship with a gap therebetween and with peripheral edges of the glass sheets being bonded with a bonding sealant to be sealed thereby; an evacuating port for evacuating gas present within said gap to the outside; and a getter for coming into contact with the gas within said gap. The invention relates also to a method of manufacturing this glass panel.

BACKGROUND ART

The getter provided in such glass panel serves to come into contact with gas present within the gap between the opposed glass sheets, thereby to adsorb and eliminate undesired gas component contained in the gas. Conventionally, there is known a construction wherein separately from the evacuating port, one of the pair of glass sheets includes a getter retaining space for retaining the getter therein (Japanese Patent No. 3082046).

Further, there are also known a construction wherein the glass sheet including the evacuating port includes a glass tube communicating with the evacuating port and projecting from the glass sheet and a further construction wherein to inner faces of the opposed glass sheets, there are formed, by deposition or sputtering, thin films made of getter material (Japanese Patent No. 3082046).

However, in the case of the construction wherein the dedicated retaining space for retaining the getter is provided separately from the evacuating port, a special manufacturing process is needed for forming the retaining space dedicated to the getter in the glass sheet, thus inviting cost increase of the glass panel.

Further, in the case of the further construction wherein the getter is retained in a glass tube, a relatively thick glass tube is required for retaining the getter. And, as this glass tube projects from the glass sheet, there arises the problem of increased risk of damage in the glass tube. Moreover, in the case of the further construction in which thin films made of getter material are formed on the inner faces of the opposed glass sheets, an operation for deposition or sputtering is required, thus again inviting cost increase of the glass panel.

DISCLOSURE OF THE INVENTION

The present invention addresses to such problems of the prior art and its object is to provide a glass panel which restricts cost increase of the glass panel when a getter is to be provided in the glass panel and which also has reduced risk of damage.

According to the first characterizing feature of the present invention, as illustrated in FIG. 3, FIG. 6 and FIG. 7, a glass panel comprises: a pair of glass sheets 1, 2 disposed with respective faces thereof confronting each other in face-to-face relationship with a gap V therebetween and with peripheral edges of the glass sheets 1, 2 being bonded with a bonding sealant 4 to be sealed thereby; an evacuating port 5 for evacuating gas present within said gap V to the outside; and a getter 7 for coming into contact with the gas within said gap V, wherein said evacuating port 5 includes a getter-retaining space 6 for retaining said getter 7 therein, said port 5 being formed in one 1 of said pair of glass sheets 1, 2, said getter 7 being retained within said getter-retaining space 6 and placed directly on the other glass sheet 2, said evacuating port 5 being closed and sealed by means of a lid 8 bonded to said one glass sheet 1 by a sealing sealant. 9

With the first characterizing feature of the invention, the evacuating port for evacuating gas present within the gap between the opposed glass sheets to the outside includes a getter-retaining space for retaining the getter and this portion is formed in one of the pair of glass sheets and the getter is retained within the getter-retaining space and placed directly on the other glass sheet. Therefore, in comparison with the conventional construction wherein the dedicated getter retaining space is provided separately of the evacuating port, the working process for the glass sheet is simple and easy, thus restricting cost increase of the glass panel. Further, in comparison also with the further construction wherein the thin films made of getter material are formed on the inner faces of the glass sheets, it is possible to significantly reduce the cost of the glass panel. Moreover, by effectively utilizing the thickness of the one glass sheet including the evacuating port, a large amount of getter can be retained.

And, since the evacuating port retaining the getter therein is closed and sealed by means of a lid bonded to said one glass sheet by a sealing sealant., unlike the above-described construction including the projecting glass tube, the sealed portion of the evacuating port does not project from the glass sheet significantly, so that the risk of the damage to the sealed portion is extremely low also.

According to the second characterizing feature of the invention, as illustrated in FIG. 3 and FIGS. 5 through 7, said evacuating port 5 comprises a port having a circular cross section, a portion of this evacuating port 5 having the circular cross section acting also as said getter-retaining space 6, the evacuating port 5 having the circular cross section having a diameter D ranging from 3.0 mm to 15.0 mm.

With the second characterizing feature of the invention, said evacuating port comprises a port having a circular cross section, and a portion of this evacuating port having the circular cross section acts also as said getter-retaining space. Hence, the same circular port can act both as the evacuating port and the getter-retaining space. For instance, in comparison with constructions wherein the evacuating port and the getter-retaining space have shapes different from each other or the evacuating port and the getter-retaining space are provided as circular ports having different diameters from each other, the working process of the glass panel can be facilitated, so that the cost increase of the glass panel can be further restricted.

And, as this evacuating port has a diameter ranging from 3.0 mm to 15.0 mm, in view of the fact that the standard getter is a circular getter having a diameter ranging from 2.0 mm to 14.0 mm, the above construction does not require any getter of special shape, but can employ the commercially available getter without any modification thereof. Hence, in this respect too, the construction can contribute to restriction of cost increase of the glass panel.

According to the third characterizing feature of the invention, as ilustrated in FIG. 3 and FIGS. 5 through 7, the getter 7 has a cylindrical shape and this cylindrical getter 7 is retained within the evacuating port 5 having the circular cross section with the axis of the getter being aligned with the axis of the port and also with securing a maximum distance L of 0.5 mm or more between an outer peripheral face of the getter 7 and an inner peripheral face of the evacuating port 5.

With the third characterizing feature of the invention, the getter has a cylindrical shape and this cylindrical getter is retained within the evacuating port having the circular cross section with the axis of the getter being aligned with the axis of the port and also with securing a maximum distance of 0.5 mm or more between an outer peripheral face of the getter and an inner peripheral face of the evacuating port. Therefore, while the evacuating port acts also as the getter-retaining space, thus achieving restriction of cost increase of the glass panel as described above, because of securing of the maximum distance of 0.5 mm or more, the operation for suction and evacuation of the gas present within the gap between the glass sheets through this evacuating port can be carried out relatively smoothly in a desired manner.

According to the fourth characterizing feature of the invention, as illustrated in FIG. 7 and FIG. 8, a heat-insulating member 16 is interposed at least between the other glass sheet 2 of the two glass sheets 1, 2 and the getter 7.

With the fourth characterizing feature of the invention, a heat-insulating member is interposed at least between the other glass sheet of the two glass sheets and the getter. Hence, even if the getter is heated locally by means of a lamp, a laser generator or the like so as to activate this getter, the conduction of the heat in the getter can be restricted at least relative to the other glass sheet.

Therefore, if the getter is supported by the other glass sheet and a gap is formed between the one glass sheet and the getter, local heating of the two glass sheets due to the heat of the getter can be effectively restricted. Consequently, damage in the glass sheets by local heating and resultant quality deterioration of the glass panel or production of defective panel can be restricted.

According to the fifth characterizing feature of the invention, as illustrated in FIG. 8, said heat-insulating member 16 is formed integrally with the getter 7.

With the fifth characterizing feature of the invention, said heat-insulating member for restricting heat conduction is formed integrally with the getter. Then, once the getter is retained within the getter-retaining space, the heat-insulating member too is retained therein and this can be set at a desired position easily. Therefore, the operation for retaining the heat-insulating member into the getter-retaining space can be done easily. Then, in case e.g. the mass production of the glass panel is carried out, cost decrease will be possible by the reduced number of working steps.

According to the sixth characterizing feature of the invention, as illustrated in FIG. 8, the getter 7 has a projection 16a, through which projection 16a the getter can come into contact with at least the other glass sheet 2 of the two glass sheets 1, 2.

With the sixth characterizing feature of the invention, the getter has a projection, through which projection the getter can come into contact with at least the other glass sheet of the two glass sheets. Therefore, even if the getter is heated and activated by means of a lamp, a laser generator or the like, heat conduction from the getter to the glass sheet can be restricted.

That is to say, since the heat of the getter is conducted to the other glass sheet via the projection which contacts the glass sheet by a relatively small contact area. Thus, when the getter is to be heated for its activation, if the getter is supported via this projection to the other glass sheet, the heat conduction from the getter to the glass sheet can be restricted even when this projection per se is not formed of a heat insulating material having low thermal conductivity. Consequently, while avoiding damage to the glass sheet due to local heating, cost increase of the glass panel can be restricted at the same time.

According to the seventh characterizing feature of the invention, as illustrated in FIG. 3, FIG. 6 and FIG. 7, the sealing sealant 9 comprises a low melting point glass having a melting point higher than the bonding sealant 4 and lower than the lid 8 and the one glass sheet 1.

With the seventh characterizing feature of the invention, the sealing sealant comprises a low melting point glass having a melting point lower than the lid and the bonding sealant. Hence, by bonding the lid by heat-melting this low melting point glass, the evacuating port can be sealed reliably.

And, in case a non-evaporating type getter which is activated by being heated is used as the getter, this getter too will be activated by heating, so that simultaneously with the heat-melting of the low melting point glass, the gas within the gap can be adsorbed effectively. In the course of this, since the melting point of the low melting point glass for bonding the lid is higher than the melting point of the bonding sealant, that is, since the melting point of the low melting point glass is relatively high, the activation of the getter associated with the heat-melting of the glass will occur conspicuously, thereby to adsorb the gas inside the gap even more effectively.

According to the eighth characterizing feature of the invention, as illustrated in FIG. 3, FIG. 6 and FIG. 7, a spacer 3 is disposed in said gap V and the gap V is sealed under a depressurized condition.

With the eighth characterizing feature of the invention, a spacer is disposed in said gap and the gap is sealed under a depressurized condition. Therefore, with the depressurization of the gap, it is possible to provide a glass panel having distinguished heat insulating performance.

And, with such glass panel, the faces of the glass sheets are subjected constantly to the atmospheric pressure, thus presenting a problem in e.g. the sealing of the evacuating port. However, with the above construction, the sealed condition of the evacuating port is secured, so that the glass panel having the superior heat insulating performance can be provided at low cost.

According to the ninth characterizing feature of the invention, as illustrated in FIG. 6, the other sheet glass 2 opposing to the evacuating port 5 defines a recess, which recess constitutes a portion of the getter-retaining space 6.

With the ninth characterizing feature of the invention, in comparison with the construction in which the getter 7 is placed directly on the lower glass sheet 2 of the two glass sheets, 1, 2, it is possible to retain a greater amount of getter 7.

According to the tenth characterizing feature of the invention, as illustrated in FIGS. 2 through 4, FIG. 6 and FIG. 7, there is provided a method of manufacturing a glass panel comprising: a pair of glass sheets 1, 2 disposed with respective faces thereof confronting each other in face-to-face relationship with a gap V therebetween and with peripheral edges of the glass sheets 1,2 being bonded with a bonding sealant 4 to be sealed thereby; an evacuating port 5 for evacuating gas present within said gap V to the outside; and a getter 7 for coming into contact with the gas within said gap V, wherein said evacuating port 5 includes a getter-retaining space 6 for retaining said getter 7 therein, said port 5 is formed in one 1 of said pair of glass sheets 1,2; and wherein after the peripheral edges of the glass sheets 1, 2 are bonded and sealed by the bonding sealant 4, the gas present within said gap V is drawn and evacuated through said evacuating port 5 with said getter 7 being retained within said getter-retaining space 6, then, said evacuating port 5 is closed and sealed by bonding a lid 8 to said one glass sheet 1 by a sealing sealant. 9.

With the tenth characterizing feature of the invention, since the evacuating port for evacuating the gas inside the gap between the opposed glass sheets to the outside includes a getter-retaining space for retaining getter therein and this port is formed on one of the opposed glass sheets, there is no necessity of providing a retaining space dedicated to the getter separately of the evacuating port and the working process on the glass sheet is easy. Moreover, after the peripheral edges of the glass sheets are bonded and sealed by the bonding sealant, the gas present within said gap is drawn and evacuated through said evacuating port with said getter being retained within said getter-retaining space. Hence, in association with the suction and evacuation from the gap, the unwanted gas component contained in the gap present within the gap can be adsorbed and eliminated by the getter. So that, the cost can be reduced through improved efficiency of the operation.

And, thereafter, said evacuating port is closed and sealed by bonding a lid to said one glass sheet by a sealing sealant. Hence, the sealed portion of the evacuating port does not project from the glass sheet significantly, thus minimizing the risk of damage to the sealed portion.

BEST MODE OF EMBODYING THE INVENTION

Embodiments of the glass panel and its manufacturing method relating to the present invention will be described with reference to the accompanying drawings.

Figure 1:
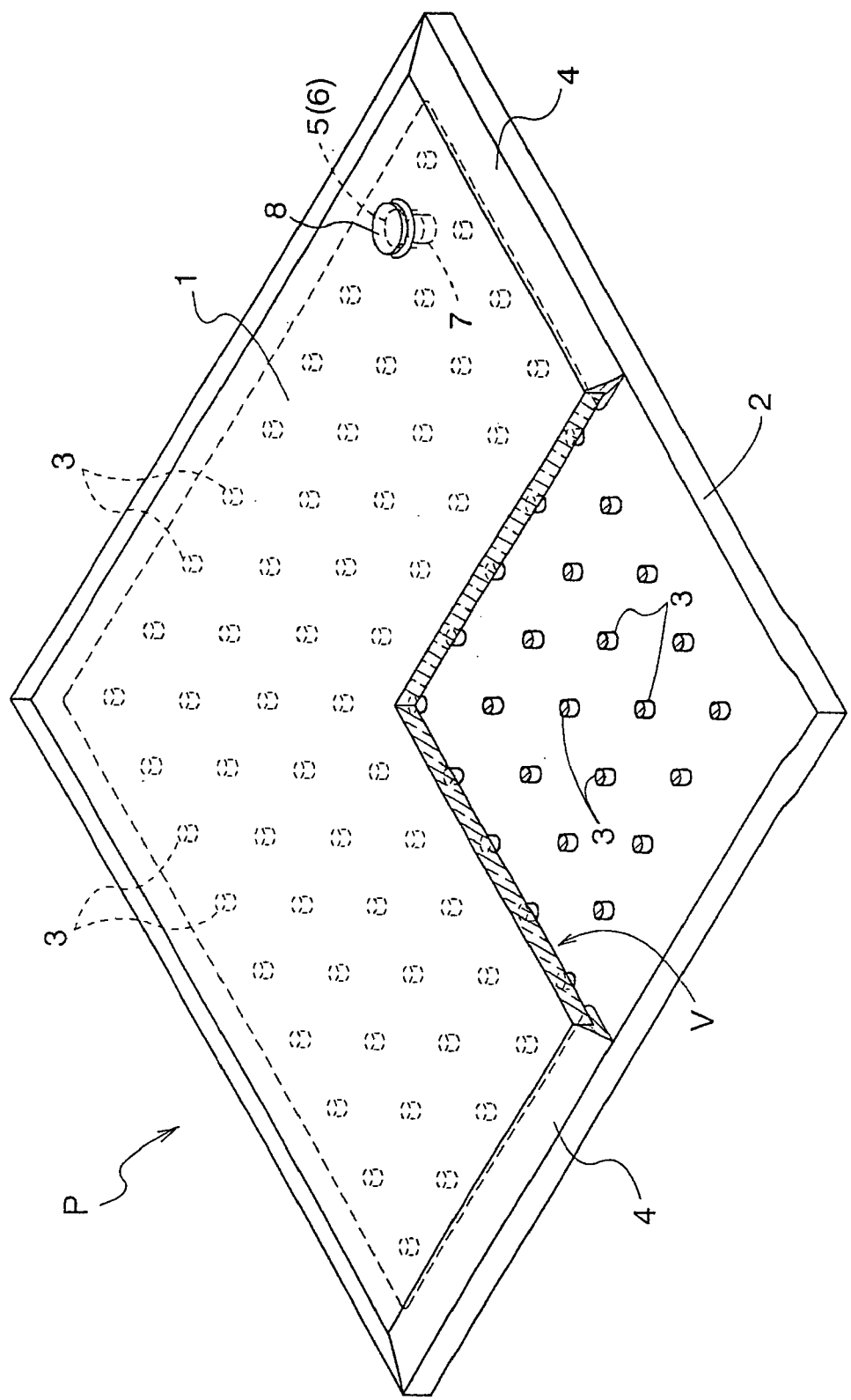
FIG. 1 is a partially cutaway perspective view of a vacuum double glazing.

An example of such glass panel is a vacuum double glazing. This double glazing P, as shown in FIG. 1, includes a pair of glass sheets 1, 2 disposed in a confronting face-to-face relationship with a number of spacers 3 interposed therebetween, thus forming a gap V between the two glass sheets 1, 2. The peripheral edges of the opposed glass sheets 1, 2 are bonded by means of a bonding sealant, specifically, a low melting point glass 4 having a melting point lower than the two glass sheets 1,2 and having also a low gas permeability. The gap V between the two glass sheets 1,2 is sealed under a depressurized condition.

Each of the glass sheets 1, 2 comprises a transparent float glass sheet having a thickness of from 2.65 to 3.2 mm approximately. The gap V between the glass sheets 1, 2 is depressurized to 1.33 Pa ($1.0 \times 10^{-2}$ Torr) or less.

Figure 3:
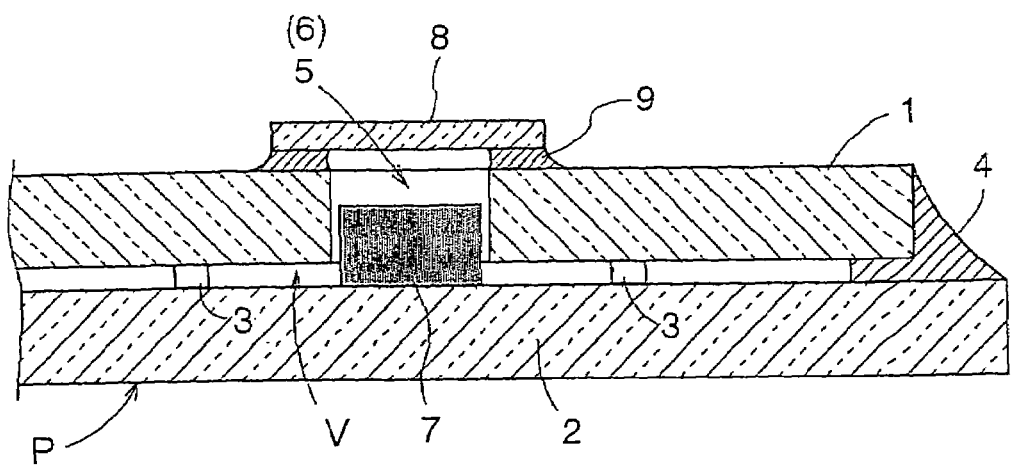
FIG. 3 is a section view showing principal portions of the vacuum double glazing.

The depressurizing operation of the gap V will be described in details later. As this gap V is depressurized by evacuating gas present therein, the one glass sheet 1, as shown in FIG. 3, defines an evacuating port 5 having a circular cross section. This evacuating port 5 is adapted to act also as a getter-retaining space 6 for retaining a cylindrical getter 7. The getter 7 is retained within this getter-retaining space 6 and a lid 8 formed of a transparent glass sheet is disposed at the opening of the evacuating port 5 and this lid 8 is fixedly bonded to the glass sheet 1 by means of a sealing sealant, specifically, a crystalline low melting point glass 9 having a melting point which is higher than the melting point of the low melting point glass 4 constituting the bonding sealant and which also is lower than the melting points of the lid 8 and the glass sheet 1, whereby the opening of the evacuating port 5 is closed in the sealed state.

The spacer 3 preferably has a cylindrical shape and is formed of a material having a compression strength of: $4.9 \times 10^8$ Pa ($5 \times 10^3$ kgf/cm$^2$) or more, so as to withstand the atmospheric pressure acting on the two glass sheets 1, 2, examples of such material being stainless steel (SUS304) and Inconel 718.

And, if the spacer 3 has such cylindrical shape, its diameter is about 0.3 to 1.0 mm and its height is about 0.15 to 1.0 mm. Further, the spacing between the respective spacers 3 is set to about 20 mm.

Next, procedure of the method of manufacturing this vacuum double glazing P will be described.

First, of the pair of glass sheets 1, 2, the one glass sheet 2 not including the evacuating port 5 is supported substantially horizontally and on the top face of its peripheral edge, the low melting point glass 4 in the form of paste is applied. Also, the plurality of spacers 3 are disposed with the predetermined spacing therebetween and on these the other sheet glass 1 is placed.

Figure 2:
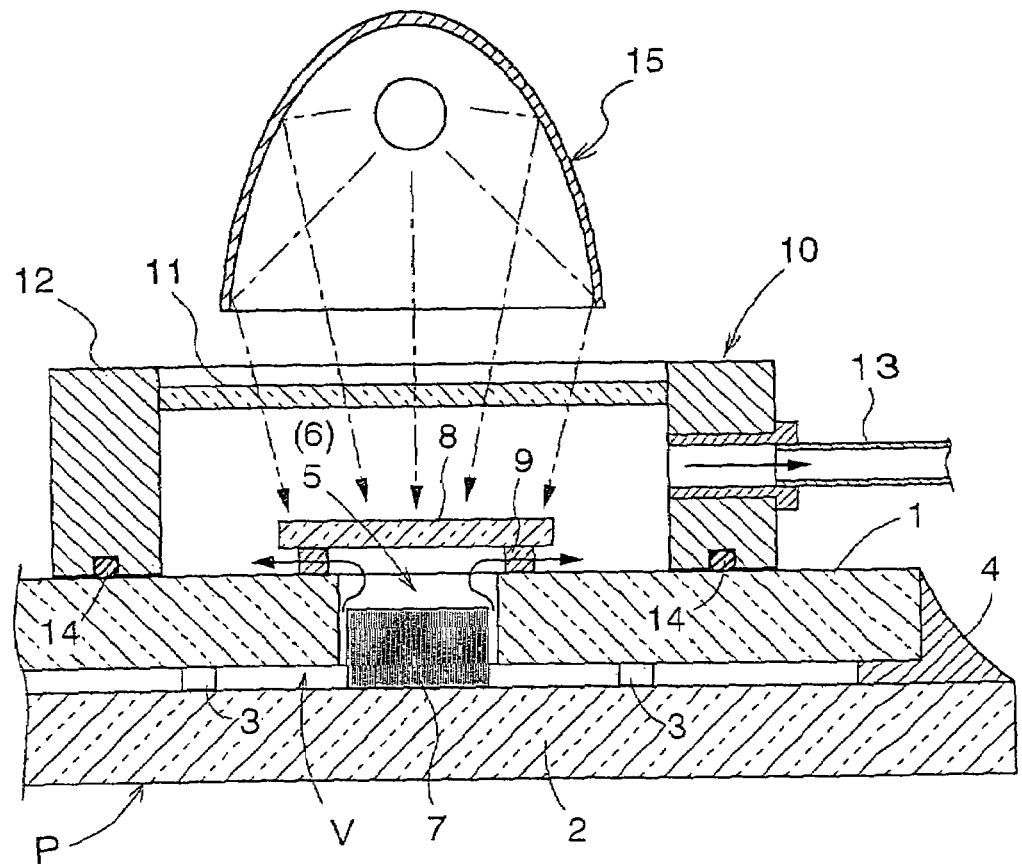
FIG. 2 is a section view showing the vacuum double glazing and a suction/sealing device in a manufacturing process.

In the above process, as shown in FIGS. 1–3, if the glass sheet 2 disposed downward is adapted have a slightly larger area so as to allow its peripheral edge to project slightly from the peripheral edge of the upper glass sheet 1, this will be convenient for e.g. the application of the low melting point glass 4.

Then, the two glass sheets 1, 2 kept under substantially horizontal postures are charged into an unillustrated heating furnace, in which the low melting point glass 4 is melted by baking and with this molten low melting point glass 4, the peripheral edges of the two glass sheets 1, 2 are bonded together for effecting bonding operation for sealing the gap V.

Thereafter, as shown in FIG. 2, the getter 7 is inserted into the evacuating port 5 of the glass sheet, which port acts also as the getter-retaining space 6, whereby the getter is retained therein. In this, as the inner diameter of the getter-retaining space 6 is slightly larger than the outer diameter of the getter 7, there is formed a distance or gap between the getter-retaining space 6 and the getter 7, through which gap the getter 7 comes into contact with gas present within the gap V.

Figure 5:
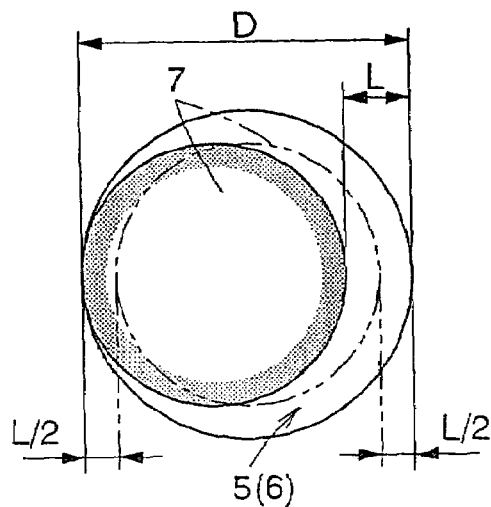
FIG. 5 is a plan view showing an evacuating port and a getter of the vacuum double glazing.

Specifically, as shown in FIG. 5, the evacuating port 5 acting also as the getter-retaining space 6 has a diameter: D of from 3.0 mm to 15.0 mm. And, when the cylindrical getter 7 is retained within this evacuating port 5 with the axis of the former being aligned with the axis of the latter as indicated by a solid line, the outer peripheral face of the getter 7 and the inner peripheral face of the evacuating port 5 together form a maximum distance L of 0.5 mm or more, preferably, 2.0 mm or more. In other words, the setting is made so as to secure a circular annular gap having a width of L/2, i.e. 0.25 mm or more, preferably, 1.0 mm or more, between the outer periphery of the getter 7 and the inner periphery of the evacuating port 5 when the axis of the evacuating port 5 is aligned with the axis of the getter 7, as shown by virtual line.

The getter 7 comes into contact with the gas present within the gap V, thereby adsorb and eliminate vapor or various gas components contained therein, such as CO, $CO_2$, $N_2$, $H_2$, $O_2$, that is, oxide gas, sulfide gas, carbide gas, organic gas, etc. As such getter, there are available the non-evaporating type which is activated when heated to adsorb the gas or the evaporating type, etc. Any type of getter 7 can be used. In this embodiment, however, the non-evaporating type getter 7 is employed.

Figure 4:
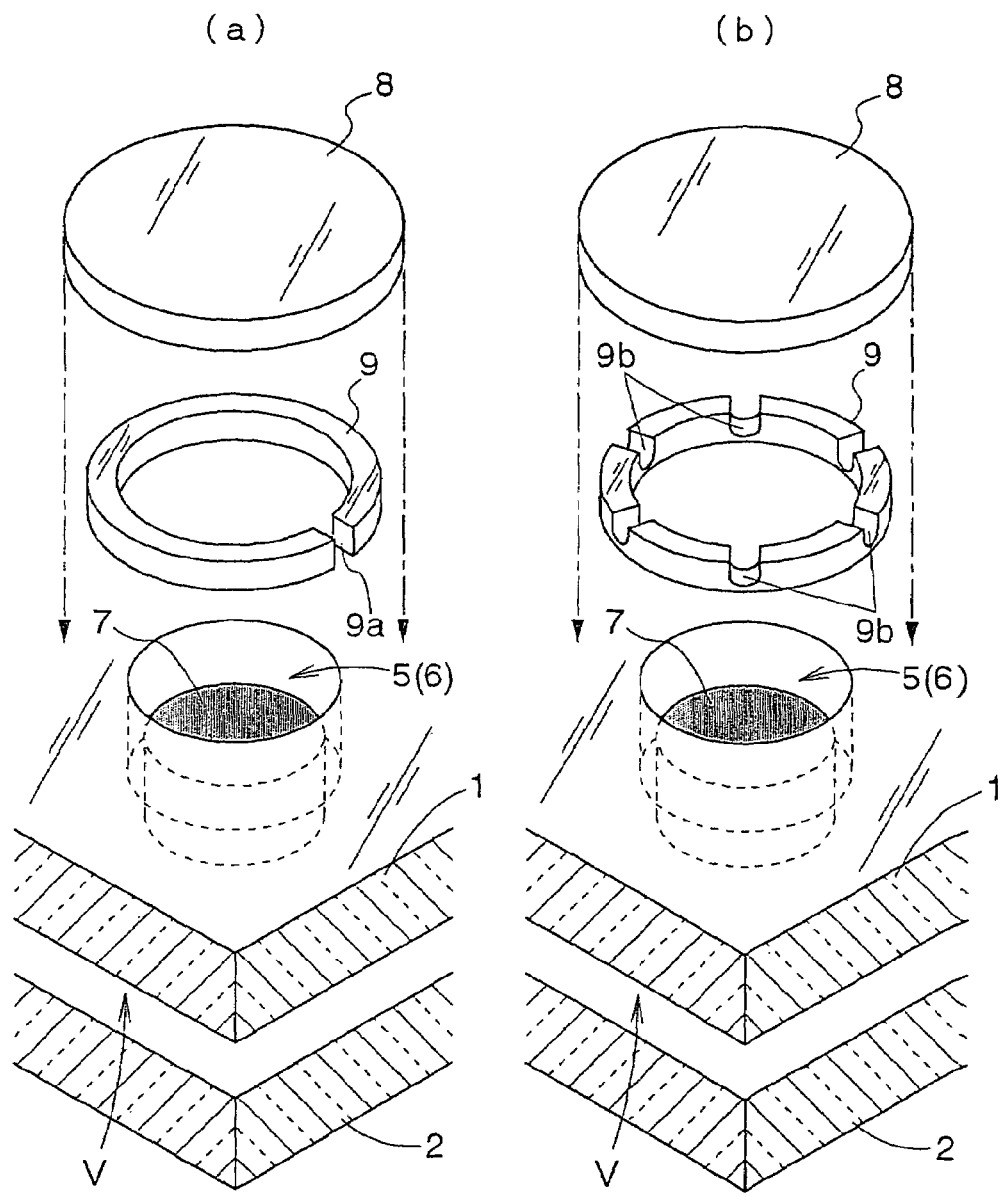
FIG. 4 is a perspective view showing the principal portions of the vacuum double glazing during the manufacturing process.

Then, after the getter 7 is retained within the getter-retaining space 6, as shown in FIG. 4(a), the crystalline low melting point glass 9 having a doughnut-like shape and including a suction cutout 9a in its peripheral portions will be placed around the evacuating port 5. Alternatively, as shown in FIG. 4(b), the crystalline low melting point glass 9 in the form of doughnut having the plurality of suction cutouts 9b in its periphery is placed and then on this a lid 8 formed of a transparent glass sheet is superposed. Further, as shown in FIG. 2, a suction/sealing device 10 is placed thereon.

The suction/sealing device 10 includes a cylindrical suction cup 12 having its top face closed with a transparent quartz glass 11. The suction cup 12 includes a flexible pipe 13 communicated with the inner space of the suction cup 12 and an O-ring 14 for providing sealing relative to the upper face of the glass sheet 1. On the outer upper face of the suction cup 12, there is disposed a heating source 15 comprising a lamp, a laser generator, etc.

Then, the suction/sealing device 10 having the above construction is set over the glass sheet 1, so that while the gap V is being heated, the inside of the suction cup 12 is depressurized by means of suction provided by a rotary pump or turbo molecular pump connected to the flexible pipe 13 and also the gas present within the gap V is forcibly drawn and evacuated through the evacuating port 5, thereby to effect a baling process, and also the inside of the gap V is depressurized to 1.33 Pa or lower.

In the course of the above-described depressurizing operation, the heating source 15 is used for locally heating the low melting point glass 9 thereby to bond the lid 8 to the glass sheet 1. In this, as this low melting point glass 9 is a crystalline glass, that is, the crystalline low melting point glass 9 which completes its crystallization in a high temperature range, foaming associated with the depressurization can be restricted, so that the lid 8 and the glass sheet 1 can be sealed reliably with bonding the lid 8 to the glass sheet 1. And, in the course of this, since the lid 8 is formed of a transparent glass, the getter 7 too can be heated and activated reliably, so that the gaseous components such as CO, $CO_2$, $H_2O$ remaining within the gap V may be adsorbed and eliminated.

Incidentally, regarding the lid 8, if this lid is formed of a glass sheet same as the pair of glass sheets 1, 2 constituting the vacuum double glazing P, that is, of a glass sheet of same type and same thickness, this will not result in deterioration in the strength of the entire vacuum double glazing P, especially, its lid 8. Further, the two glass sheets 1, 2 for the vacuum double glazing P and the lid 8 can be prepared by cutting them from a same glass sheet, advantageously.

However, if the lid 8 has too large thickness, this will increase the possibility of damage thereof through contact with an object. Therefore, use of glass sheet having an extremely large thickness should be avoided. In this respect, a sheet of thickness of 3.0 mm or less is preferred. Further, in use, the lid 8 is subjected to a stress equivalent to or slightly greater than the atmospheric pressure, thickness of 0.5 mm or more will suffice to withstand the stress. Therefore, the thickness of the glass constituting the lid 8 should be appropriately selected from the range of 0.5 mm to 3.0 mm, depending on the use condition and application. As for its size too, if the evacuating port 5 is circular, the lid should preferably have a diameter 2.0 mm or more greater than the diameter D of the port.

[Other Embodiments]

Next, other embodiments will be described. In the following description, in order to avoid redundancy of description, the same members or members having same functions as those described in the foregoing embodiment will be denoted with the same reference marks and will not be described again. And, only the differences from the foregoing embodiment will be described.

(1) In the foregoing embodiment, the evacuating port 5 defined in the one glass sheet 1 acts completely also as the getter-retaining space 6 for retaining the getter 7. Instead, as shown in FIG. 6(a), it is also possible to provide a recess in the other glass sheet 2 opposing to the evacuating port 5, so that this recess may constitute a part of the getter-retaining space 6.

Figure 6:
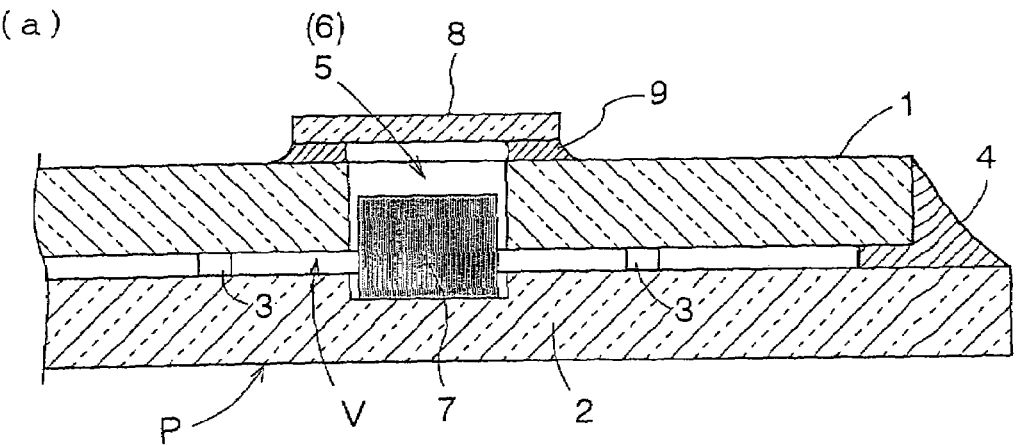
FIG. 6 is a section view showing principal portions of a vacuum double glazing relating to a further embodiment.
Figure 6:
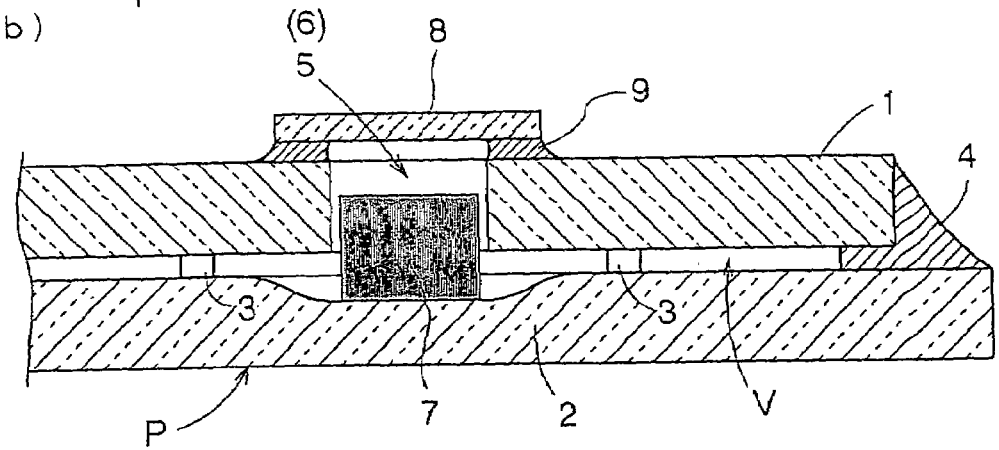

Further, as shown in FIG. 6(b), it is possible to form this recess defined in the other glass sheet 2 as a recess having a relatively smooth surface, so as to relieve stress concentration. With these alternative constructions shown in FIGS. 6(a) and (b), it is possible to retain a greater amount of getter 7 than the construction of the foregoing embodiment.

Figure 7:
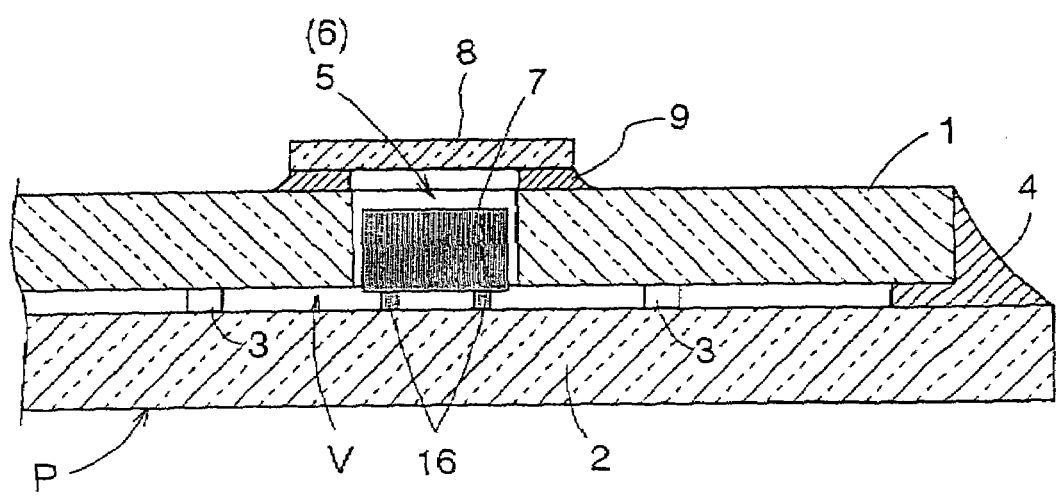
FIG. 7 is a section view showing principal portions of a vacuum double glazing relating to a further embodiment.

(2) In the foregoing embodiment, the getter 7 is placed directly on the lower glass sheet 2 of the two glass sheets 1, 2. Instead, as shown in FIG. 7, it is possible to provide an annular heat-insulating member 16 for restricting heat transmission from the getter 7 separately of this getter 7 and dispose this heat-insulating member 16 between the lower glass sheet 2 and the getter 7, with forming a gap between the upper glass sheet 1 and the getter 7.

With this construction, it is possible to restrict conduction of the heat used for activating the getter 7 from this getter 7 to the two glass sheets 1, 2, so that local heating of the two glass sheets 1, 2 may be restricted.

Figure 8:
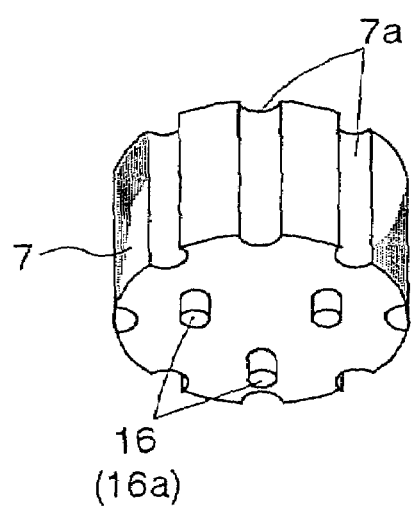
FIG. 8 is a perspective view of a getter relating to a further embodiment.

Incidentally, the heat-insulating member 16 is made preferably of a material having low thermal conductivity such as alumina type ceramics. However, as shown in FIG. 7, it can have a circular annular shape or can comprise a plurality of projections as shown in FIG. 8 so as to reduce the contact area relative to the lower glass sheet 2. In such case, it is not needed especially to form the member 16 of such material having low thermal conductivity. Hence, in the embodiment shown in this FIG. 8, the projections 16a can be formed of stainless steel or iron also.

That is, in the embodiment shown in FIG. 8, the projections per se comprise the heat-insulating member 16. Hence, there is even less necessity of forming it of the heat-insulating member 16. It can be formed of e.g. stainless steel or iron.

In such case, compared with the construction using the heat-insulating member 16, its performance in the thermal conductivity to the glass sheet 2 will be slightly inferior. However, as this construction does not require the use of e.g.

alumina type ceramics which is relatively expensive, the construction can contribute to restriction of cost increase of the glass panel.

Moreover, in this embodiment shown in FIG. 8, it is also possible to form the projections 16*a* of the same material as that of the getter 7, thus forming the getter 7 and the projections 16*a* integrally. With such integral formation of the getter 7 and the projections 16*a* of a same material, it becomes possible to facilitate the manufacture of the getter 7 having the projections 16*a*. Consequently, it is possible to restrict cost increase of the getter 7 with projections 16*a*.

Further, regarding the shape of the getter 7, in place of the perfect cylindrical shape, as shown in FIG. 8, it may be formed as a cylinder having a plurality of slits 7*a* in its outer periphery, so as to increase the contact area to the gas present within the gap V.

However, such perfect cylindrical shape or the cylindrical shape with slits 7*a* are not absolutely needed. Instead, it can be a variety of shapes such as a column like shape having an oval or polygonal cross section or a cylindrical shape having an annular cross section.

Similarly, the shape of the evacuating port 5 acting also as the getter-retaining space 6 is not particularly limited to the circular cross section. Instead, it can be a port having an oval or polygonal cross section. In such case, if the evacuating port 5 has a rectangular cross section, it is preferred that the getter 7 too have a rectangular cross section.

(3) In the foregoing embodiment, the bonding sealant for bonding the peripheral edges of the pair of glass sheets 1, 2 comprise the low melting point glass 4. In place of the low melting point glass, the bonding can be done also by using a metal molten solder.

Further, the crystalline low melting point glass 9 has been described as an example of the sealing sealant for bonding the lid 8 to the glass sheet 1 thereby to seal the opening of the evacuating port 5. Instead, a non-crystalline low melting glass or metal molten solder may be employed for the sealing.

Regarding the lid 8 too, this is not limited to the glass lid described in the foregoing embodiment. Instead, for instance, the lid 8 can be formed of various kinds of material such as metal, ceramics, etc. In such case, if the activation of the getter 7 by the heating source 15 of the suction/sealing device 10 becomes insufficient due to e.g. the material used for forming the lid 8, then, in the construction of FIG. 2, a heating source for getter activation will be disposed downwardly of the glass sheet 2, so that this heating source for activation may be used in combination with the heating source of the suction/sealing device 10, or that the heating source disposed downwardly of the glass sheet 2 may be used for effecting heat-melting of the low melting point glass 9 and the activation of the getter 7 at one time.

(4) In the foregoing embodiment, the vacuum double glazing P was described as an example of the glass panel. Instead, the invention may also be used in manufacture of a plasma display panel including a pair of glass sheets 1, 2 with a gas being sealed in a gap V therebetween. In this case, the predetermined gas will be charged and sealed in the gap V after the baking process is effected.

Further, regarding the use of the glass panel, it can be used in various applications, such as a window pane for a building or a vehicle (automobile, railway car, boat) or instruments such as a plasma display or a door or a wall of various machines such as a refrigerator, a thermal insulator, etc.

Therefore, the glass sheets 1, 2 constituting the glass panel P are not limited to the float glass sheets described in the foregoing embodiment. Depending on its use and application of the glass panel P, it may be a figured glass, frosted glass provided with the function of diffusing light through a surface treatment, mesh glass, wire glass sheet, a reinforced glass, double-reinforced glass, low reflection glass, high transmission glass sheet, ceramic printed glass, special glass provided with a function of heat absorption, heat reflection, UV absorption, etc. or any combination of these. Further, the composition of the glass may be soda-silica glass, soda-lime glass, borosilicate glass, aluminosilicate glass, various kinds of crystallized glass. And, the thickness of the glass sheets 1, 2 too may be freely selected as appropriate.

Also, the material of the spacer 3 is not limited to the stainless steel or Inconel. Instead, it may be a metal such as iron, copper, aluminum, tungsten, nickel, chromium, titanium, an alloy such as carbon steel, chromium steel, nickel steel, nickel-chrome steel, manganese steel, chromium-manganese steel, chrome molybdenum steel, silicon steel, brass, solder, duralumin, etc, ceramics, or glass. In short, any material may be used if it is hardly deformed by an external force. And, its shape too is not limited to the cylindrical shape, but may be a variety of shapes such as angular column-like shape or spherical shape, etc.

INDUSTRIAL APPLICABILITY

To obtain e.g. a vacuum double glazing, it is possible to obtain a glass panel which does not require a dedicated getter-retaining space.

The invention claimed is:

1. A glass panel comprising:
   a pair of glass sheets with a gap therebetween and with peripheral edges of said glass sheets being bonded with a bonding sealant;
   an evacuating port for evacuating gas present within said gap to the outside; and
   a getter for coming into contact with the gas within said gap;
   wherein said evacuating port includes a getter-retaining space for retaining said getter therein, said evacuating port being formed in one glass sheet, said getter being retained within said getter-retaining space and placed directly on the other glass sheet opposing said evacuating port, said evacuating port being closed and sealed by means of a lid bonded to said one glass sheet by a sealing sealant.

2. The glass panel of claim 1, wherein said evacuating port comprises a circular cross section having a diameter ranging from 3.0 mm to 15.0 mm; wherein a portion of said evacuating port acts as said getter-retaining space.

3. The glass panel of claim 2, wherein said getter having a cylindrical shape is retained within said evacuating port such that an axis of said getter is aligned with an axis of said evacuating port and secures a maximum distance of 0.5 mm or more between an outer peripheral face of said getter and an inner peripheral face of said evacuating port.

4. The glass panel of claim 1, further comprising a heat-insulating member interposed at least between other glass sheet of said pair of glass sheets and said getter.

5. The glass panel of claim 4, wherein said heat-insulating member is formed integrally with said getter.

6. The glass panel of claim 1, wherein said getter comprise a projection, said projection can come into contact with at least other glass sheet of said pair of glass sheets.

7. The glass panel of claim 1, wherein said sealing sealant comprises a low melting point glass having a melting point higher than the bonding sealant but lower than the lid and said one glass sheet.

8. The glass panel of claim 1, further comprising a spacer disposed in said gap; and wherein said gap is sealed under a depressurized condition.

9. A method of manufacturing a glass panel comprising the steps of:
- disposing a pair of glass sheets with respective faces thereof confronting each other in face-to-face relationship with a gap therebetween;
- bonding and sealing peripheral edges of the glass sheets with a bonding sealant;
- contacting the gap within said gap with a getter;
- evacuating gas present within said gap to the outside via an evacuating port;
- said evacuating port comprises a getter-retaining space for retaining said getter therein, said getter being retained within said getter retaining space and placed directly on the other glass sheet opposing said evacuating port and said evacuating port being formed in one of said pair of glass sheets; and
- closing and sealing said evacuating port by bonding a lid to said one glass sheet by a seating sealant.

10. The glass panel of claim 1, wherein said other glass sheet opposing said evacuating port comprises a cavity which constitutes a portion of said getter-retaining space.

* * * * *